H. P. KRAFT.
VALVE REPAIR TOOL.
APPLICATION FILED FEB. 20, 1918.
1,435,904. Patented Nov. 14, 1922.
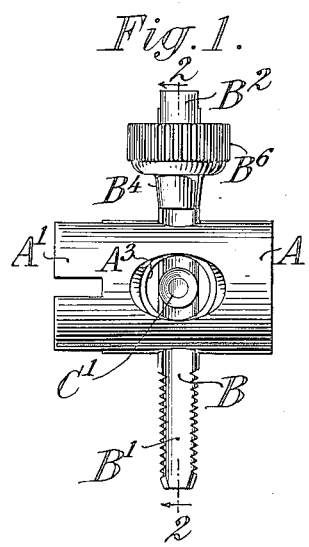
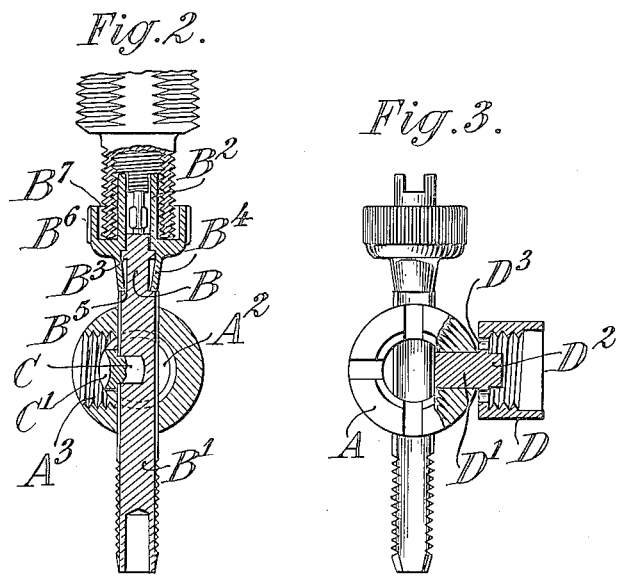
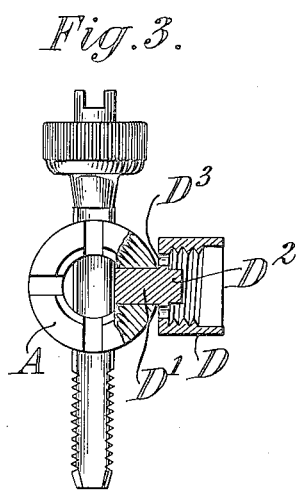
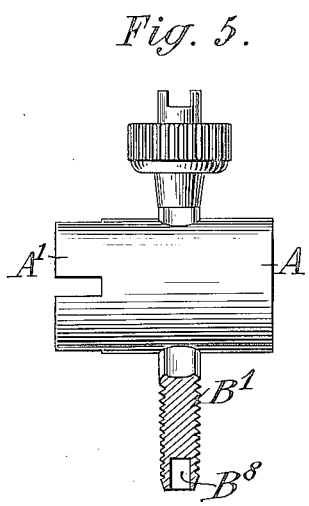
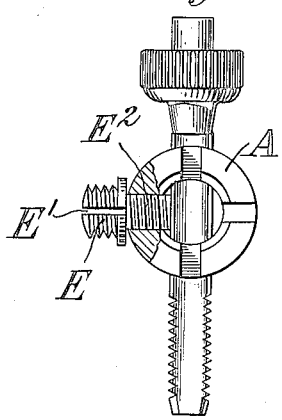
WITNESS:
INVENTOR: Henry Phillip Kraft
By Attorneys, Patented Nov. 14, 1922.

1,435,904

UNITED STATES PATENT OFFICE.

HENRY PHILLIP KRAFT, OF RIDGEWOOD, NEW JERSEY.

VALVE-REPAIR TOOL.

Application filed February 20, 1918. Serial No. 218,301.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Valve-Repair Tools, of which the following is a specification.

The invention has to do with a valve repair tool and is in the nature of an improvement upon the construction disclosed in my Patent No. 1,199,084, of September 26, 1916.

The structure to which my improvement is directed comprises generally an instrument-carrying body portion provided with a die for repairing external threads of a pneumatic tire valve, and an attached instrument-carrying handle portion which may have at one end a tap for repairing the internal threads of such valve and at the other end, a suitable device, such as a screwdriver, for withdrawing the valve parts or "insides" from the valve casing.

It is my purpose to apply to such a tool, an instrumentality for deflating a tire, which is accomplished by holding the valve proper in open position, and the invention is intended to provide the valve tool with convenient and readily applicable means that will permit of quickly exhausting air from a tire, preliminarily or subsequently to any of the usual repair operations. I attain this purpose by providing the body portion of the tool with a retaining device adapted to engage the tire valve casing, and in co-operation therewith a deflating means which engages the valve and holds it in open position. This device is preferably arranged on one side of the body portion where it can be most conveniently brought into operative relationship with the tire valve, and manipulated by the handle portion.

An additional purpose of the invention is to provide an improved form of screwdriver attachment, whereby the length of the tool can be considerably reduced and the amount of material used and cost correspondingly lessened without affecting the operating efficiency of the instrument. This I accomplish by employing an operating portion preferably in the form of an annular ring in spaced relation to the screwdriver, and permitting the valve casing to be received between the operating portion and the screwdriver. This permits the length of the device to be considerably shortened in comparison with a structure where there is no space afforded between the screwdriver and the operating portion, with the resultant necessity of elongating the screwdriver sufficiently to permit it to enter the valve casing and cooperate with the valve parts. To these and other ends the invention consists in certain improvements and details of parts, as will be hereinafter more fully described and pointed out in the following claim.

In the drawings,—

Figure 1 is a side elevation showing a preferred embodiment of the invention;

Fig. 2 is a sectional view on line 2—2 of Fig. 1.

Fig. 3 is a side elevation, partially in section, showing a modified form of the invention; and Fig. 4 is a side elevation, with parts in section, showing a further modification, and Fig. 5 is a side elevation, partially in section, showing a modified form of my invention.

Like reference characters throughout the several views indicate similar parts.

In the structure shown A designates the instrument-carrying body portion which may be provided with a die A' for dressing the external threads of a valve casing. The body portion A has a longitudinally-extending central opening A², and B designates generally an instrument-carrying handle portion or handle member which is rigidly secured in a transverse opening extending through the body portion A. The handle portion B carries at one end a tap B' with which the interior threads of a valve casing can be repaired while B² designates a screwdriver at the opposite end for removing or inserting the valve parts, and this will be described presently in greater detail.

The body portion A is provided with a retaining device which serves to hold the tool in engagement with a tire valve casing, and co-operating with the retaining device is a deflating means that engages and opens the valve within the casing. This may be accomplished in the manner illustrated in Figs. 1 and 2, where there is employed a threaded retaining socket A³ adapted to engage the exterior threads of a pneumatic tire valve casing. The deflating means consists of an abutment or projection C which may be in the form of a pin, frictionally held in the handle portion B and having a head with a suitable socket or depression C' to engage the outer end of the valve stem. By threading the socket portion A³ upon the valve casing, the deflating pin C engages the valve and holds it in open position as long as the tool is retained.

A slightly modified form of the invention is shown in Fig. 3, which includes a threaded retaining socket D carrying an integral pin D' which is held frictionally in an opening provided for the purpose in the body portion A. The pin D' has an extension or abutment D² which serves as a deflating means when the socket D is threaded on the valve casing. The abutment D² engages the valve stem, holding the valve open while air from the tool is exhausted through the openings D³.

A still further modification of this feature of my improvement is illustrated in Fig. 4, in which a threaded pin E is provided which is adapted to engage the internal thread of the valve casing. The pin E constitutes both the means for retaining the valve casing and also the deflating instrumentality, since when this is secured within the valve casing, it engages the stem and moves the valve to an open position. The pin E is split longitudinally at E' to afford an opening for permitting the air to exhaust from the casing, and is provided with a projection or extension E² which is frictionally held within an opening provided in the body portion A, or is screwed therein as shown.

Referring now to Fig. 2 and to the screwdriver attachment already mentioned, the screwdriver B² is seated upon a shoulder B³ of the handle portion B. The screwdriver also carries a cylindrical extension B⁴ which is turned inwardly around the handle portion B and engages a second shoulder B⁵. The screwdriver B² is provided with an annular manipulating portion or ring B⁶ which is preferably formed integral therewith, but spaced, affording a recess B⁷ between the screwdriver and the manipulating portion, which receives the outer end part of the valve casing into which the screwdriver is inserted. This arrangement permits the screwdriver to assume the proper operating position with respect to the valve parts to be removed from a valve casing, and with a tool of minimum length, owing to the saving afforded by disposing a part of the valve casing in the space between the screwdriver and the manipulating portion B⁶. This also requires less material in manufacturing the tool, resulting in a lighter structure and a certain measure of economy in saving of material.

In the modification shown in Fig. 5, the tap B' is formed so as to constitute the deflator. This is accomplished by reducing the depth of the opening B⁸ to such an extent that the valve pin will be engaged by the bottom of the recess, when the tap is inserted within the valve housing.

While I have shown and described several forms of the invention, it will be understood that I do not wish to be limited thereto, since various changes may be made therein without departing from the invention.

The combination of the wrench or screwdriver construction with other elements herein disclosed is claimed in my divisional application Serial No. 364,994 filed March 11, 1920.

What I claim is:—

A tire valve repair tool, comprising a hollow instrument-carrying body portion, an instrument-carrying handle member extending transversely through the body portion and attached thereto, tire deflating means associated with said tool and seating against the handle member, and retaining means acting to hold said tool on a valve casing during the deflating operation.

In witness whereof, I have hereunto signed my name.

HENRY PHILLIP KRAFT.